United States Patent
Udengaard et al.

[11] Patent Number: 5,997,834
[45] Date of Patent: Dec. 7, 1999

[54] PROCESS FOR THE PREPARATION OF AMMONIA

[75] Inventors: Niels Udengaard, Houston; John Skaanderup-Larsen, Clear Lake Shores, both of Tex.

[73] Assignee: Haldor Topsoe A/S, Lyngby, Germany

[21] Appl. No.: 08/851,283

[22] Filed: May 5, 1997

Related U.S. Application Data

[60] Provisional application No. 60/017,283, May 13, 1996.

[51] Int. Cl.⁶ .................................................. C01C 1/04
[52] U.S. Cl. ........................... 423/361; 422/148; 423/359
[58] Field of Search .................................. 423/359, 361; 422/148

[56] References Cited

U.S. PATENT DOCUMENTS

| | | | |
|---|---|---|---|
| 1,931,678 | 10/1933 | Porter | 423/361 |
| 2,046,478 | 7/1936 | O'Leary | 423/361 |
| 4,180,543 | 12/1979 | Ward | 422/148 |
| 4,181,701 | 1/1980 | Topsoe et al. | 422/158 |
| 4,294,932 | 10/1981 | Lohmuller et al. | 518/706 |
| 4,298,589 | 11/1981 | LeBlanc et al. | 423/359 |

FOREIGN PATENT DOCUMENTS

| | | |
|---|---|---|
| 0075056 | 3/1983 | European Pat. Off. . |
| 2705141 | 8/1978 | Germany . |

*Primary Examiner*—Wayne Langel
*Attorney, Agent, or Firm*—Ostrolenk, Faber, Gerb & Soffen, LLP

[57] ABSTRACT

A process for the preparation of ammonia from a hydrogen- and nitrogen-containing synthesis gas having a combined compression step in the recirculation of synthesis gas from at least two ammonia synthesis loops. The process includes admixing to the synthesis gas a recycle gas from a first and a second ammonia separation step. The admixed gases are pressurized, and the gas is divided into a first make-up gas stream and a second make-up gas stream. The first make-up gas stream is introduced to a first ammonia reactor, and a first process stream rich in ammonia is withdrawn. The second ammonia make-up gas stream is introduced into a second ammonia reactor, and a second process stream rich in ammonia is withdrawn. Ammonia from the first and second process streams is separated. The remainders of the first and second process streams are recycled for admixing with the synthesis gas. The separated ammonia is combined and withdrawn as an ammonia product stream.

5 Claims, 1 Drawing Sheet

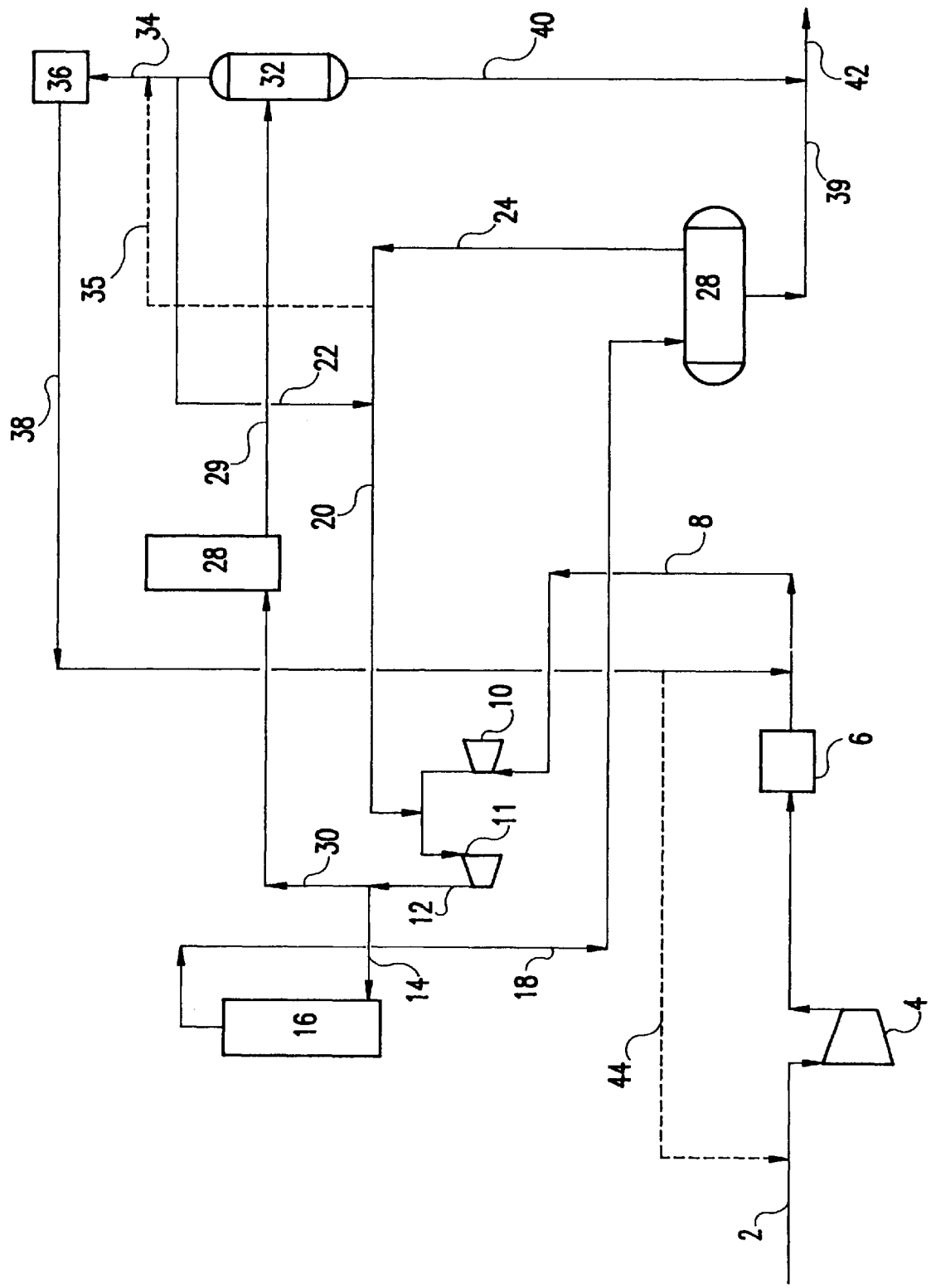

PROCESS FOR THE PREPARATION OF AMMONIA

This application claims the benefit of provisional application Ser. No. 60/017,283, filed May 13, 1996.

BACKGROUND OF THE INVENTION

1. Field of the Invention

The present invention relates to certain improvements in the preparation of ammonia from a hydrogen- and nitrogen-containing ammonia synthesis gas.

More particularly, this invention concerns synthesis of ammonia at high production capacity in at least two ammonia synthesis reactors arranged in parallel synthesis loops with one combined compression step of synthesis recycle gas.

2. Description of the Related Art

Synthesis of ammonia conventionally is performed by passing a process stream of synthesis gas, containing nitrogen and hydrogen in essentially stoichiometric amounts, to the formation of ammonia through a catalyst arranged in one or more beds in a reactor.

Thermodynamically, the reaction of hydrogen and nitrogen to ammonia requires the reaction to be performed at elevated temperature and pressure, usually above 100 atmospheres and at temperatures between 300° and 600° C. At the above process conditions, the equilibrium concentration of ammonia in a stoichiometric synthesis gas composition is below 20% by volume in the synthesis gas stream from the reactor. The stream has to be recycled to the reactor, together with fresh synthesis gas, in order to provide a reasonably sufficient ammonia product yield.

Prior to recycling, the stream is cooled to separate ammonia from unreacted hydrogen, nitrogen, and inert diluents present in the synthesis gas. A fraction of the recycle gas is purged to vent inerts. The stripped gas is then passed to a compression stage by which it is recycled to the reaction.

Expenses for compressing and recycling synthesis gas are important factors in the economy of ammonia production in general, and in particular when production capacities of existing ammonia synthesis loops have to be increased.

Accordingly, the need exists for ammonia production processes having reduced expenses, such as those associated with compressing and recycling synthesis gas. In addition, the need exists for economical methods of increasing the production capacities of existing ammonia synthesis plants.

SUMMARY OF THE INVENTION

The present invention overcomes the deficiencies of the prior art by providing a process for the preparation of ammonia from a hydrogen and nitrogen-containing synthesis gas having a combined compression step in the recirculation of synthesis gas from at least two ammonia synthesis loops.

The process includes the steps of:

(a) admixing, with synthesis gas, recycle gases from ammonia separation steps (f) and (g) below;

(b) pressurizing the admixed synthesis and recycle gases from step (a);

(c) dividing the pressurized gases from step (b) into a first make up gas stream and a second make up gas stream;

(d) introducing the first make up gas stream into a first ammonia reactor and withdrawing a first process stream rich in ammonia;

(e) introducing the second ammonia make up gas stream into a second ammonia reactor and withdrawing a second process stream rich in ammonia;

(f) separating ammonia from the first process stream and recycling the remainder of the process stream to step (a);

(g) separating ammonia from the second process stream and recycling the remainder of the process stream to step (a);

(h) combining separated ammonia from steps (f) and (g) and withdrawing an ammonia product stream.

The above process may comprise one or more additional steps, including the following:

pressurizing the ammonia synthesis gas prior to step (a) above;

purifying the pressurized ammonia synthesis gas by removing water and carbon dioxide; and further pressurizing the purified ammonia synthesis gas.

The invention is particularly useful when increased production capacity of an existing ammonia loop is required. When revamping the existing loop according to the present invention, an additional ammonia synthesis loop is connected in parallel to the existing loop.

An existing loop includes, for example, a recirculation compressor and a stream for cycling a first make-up gas stream from the compressor to an ammonia reactor. Also, a first process stream rich in ammonia from the reactor is separated into an ammonia product stream and a remainder of the first process stream. The remainder of the first process stream is cycled to the recirculation compressor.

The inventive method includes adding a second, parallel synthesis loop. The second loop includes a second ammonia reactor, and a stream to cycle a second make-up gas stream from the recirculation compressor of the existing loop to the second ammonia reactor. A second process stream rich in ammonia is withdrawn from the second reactor and separated into a second ammonia product stream. The remainder of the second process stream is recycled to the remainder of the first process stream in the existing loop. Also, the second make-up gas stream is cycled to the first make-up gas stream in the existing loop.

As an advantage of the invention, the existing synthesis gas recirculation compressor, optionally after modification, recycles both recycle synthesis gas flows from the existing loop and the connected additional loop. Thereby, only two tie-ins will be required in the synthesis loop, which are positioned upstream and downstream of the recirculation compressor, respectively.

Other features and advantages of the present invention will become apparent from the following description of the invention which refers to the accompanying drawings.

BRIEF DESCRIPTION OF THE DRAWINGS

The sole FIGURE shows a simplified flow diagram of the invention.

DETAILED DESCRIPTION OF THE PREFERRED EMBODIMENTS

Reference is made to the sole FIGURE representing a simplified flow scheme of the inventive process. Ammonia synthesis gas 2 is compressed in a first stage of synthesis gas compression 4 to 940 psig. The compressed gas is passed through a molecular sieve unit 6 for removal of $H_2O$ and $CO_2$. Dried and purified synthesis gas 8 is then passed to a second stage of synthesis gas compression 10 where it is compressed first to 1967 psig, and then mixed with recycle gas 20. Recycle gas 20 is provided by combining recycle gas 22 from a second separator 32 and recycle gas 24 from a first separator 26. Recycle gases 22 and 24 are heated in one or more heat exchangers (not shown) prior to their combination.

The mixture of synthesis gas and combined recycle gas is further compressed to 2122 psig in a recirculation compression stage 11. 88.1% of the synthesis gas 12 leaving synthesis gas compression stage 11 is passed in stream 14 to a hot gas heat exchanger (not shown) and to a first ammonia synthesis reactor 16 being indirectly cooled and adapted to radial gas flow as described in U.S. Pat. No. 4,181,701, incorporated herein by reference. Effluent gas 18 from reactor 16 is cooled in a conventional heat exchanger train (not shown), and 1591 STPD of liquid ammonia is separated in separator 26 from the gas, before separated unconverted gas 24 is mixed with unconverted gas in stream 22.

The remaining 11.9% of the synthesis gas leaving synthesis gas compression stage 11 is passed in stream 30 to a second, indirectly-cooled, radial flow ammonia synthesis reactor 28. Effluent gas 29 from reactor 28 is cooled in a series of heat exchangers (not shown) and 218 STPD of liquid ammonia is separated in separator 32 from the gas. Unconverted gas leaving separator 32 is separated into a small purge gas stream 34 and the remaining unconverted gas stream 22.

Gas stream 22 is mixed with unconverted synthesis gas from separator 26 and passed on to the recycle part of synthesis gas compression stage 11, as described above. Alternatively, purge gas stream 34 may be taken from stream 24 as shown by dotted line 35 in the FIGURE.

A part of the hydrogen contained in purge gas stream 34 is recovered in a conventional hydrogen recovery unit 36 and recycled in stream 38 to synthesis gas stream 8. Liquid ammonia product 39 from separator 26 is combined with liquid ammonia product 40 from separator 32 and withdrawn in product stream 42. Recycle stream 38 from hydrogen recovery unit 36 alternatively may be recycled to stream 2. Alternatively (in the case of a two stage recovery unit), it may be recycled to stream 8 and stream 2 as shown by dotted line 44 in the FIGURE.

Composition of the streams described above is summarized in the Table below.

The hydrogen recovery unit 36 typically is existing equipment used for removal of inerts from the synthesis loop. The preferred location of the purge point is the stream with the highest concentration of inerts. This stream typically will be the stream exiting the separator 32. In such a case, the hydrogen recovery unit 36 is included in the new loop. This is the expected mode of operation after installation of the parallel loop.

It is possible in special cases that the stream with the highest concentration of inerts is the stream leaving separator 26. This would be the case, for example, if the catalyst in reactor 16 is new and the catalyst in reactor 28 is old or deactivated. In such a case, it is best to feed to hydrogen recovery unit 36 a part of the stream 24 on line 35. Unit 36 can be viewed as a piece of auxiliary equipment which normally is fed with gas from the new loop and returns hydrogen-rich gas to both loops.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Process for the preparation of ammonia from a hydrogen and nitrogen-containing synthesis gas in at least two parallel ammonia synthesis loops, the process comprising the steps of:
    (a) admixing to the synthesis gas a recycle gas from a first and a second parallel ammonia separation step;
    (b) pressurizing the admixed gas from step (a) in a single recirculation compression stage;
    (c) dividing the gas from step (b) into a first make-up gas stream and a second make-up gas stream;
    (d) introducing the first make-up gas stream into a first ammonia reactor and withdrawing a first process stream rich in ammonia;
    (e) introducing the second ammonia make-up gas stream into a second ammonia reactor and withdrawing a second process stream rich in ammonia;
    (f) separating ammonia from the first process stream and recycling a remainder of the first process stream to step (a);
    (g) separating ammonia from the second process stream and recycling a remainder of the second process stream to step (a);

TABLE

| | Stream No. | | | | | | | | | |
|---|---|---|---|---|---|---|---|---|---|---|
| Comp./mol % | 2 | 14 | 18 | 20 | 22 | 24 | 29 | 30 | 34 | 38 |
| $H_2$ | 73.6 | 66.3 | 54.0 | 63.3 | 63.3 | 63.3 | 53.9 | 66.3 | 63.3 | 88.3 |
| $N_2$ | 25.4 | 22.1 | 18.0 | 21.1 | 21.1 | 21.1 | 18.0 | 22.1 | 21.1 | 9.7 |
| $NH_3$ | 0. | 1.4 | 16.3 | 1.9 | 1.9 | 1.9 | 16.4 | 1.4 | 1.9 | 0.0 |
| Ar | 0.3 | 3.7 | 4.3 | 5.0 | 5.0 | 5.0 | 4.3 | 3.7 | 5.0 | 1.4 |
| $CH_4$ | 0.7 | 6.5 | 7.4 | 8.7 | 8.7 | 8.7 | 7.4 | 6.5 | 8.7 | 0.6 |

According to the present invention, a method of increasing production capacity of an existing ammonia synthesis process from a hydrogen and nitrogen-containing synthesis gas includes connecting a new parallel ammonia loop to an existing synthesis loop. Referring to the FIGURE, the existing loop includes, for example, streams 2, 8, 12, 14, 18, 39, 24, 34, 20, and 38. Hydrogen recovery unit can be connected to the existing loop by stream 35, for example. The new parallel loop includes the following streams: 30, 29, 22, and 40.

(h) combining the separated ammonia from step (f) and step (g) and withdrawing an ammonia product stream.

2. The process according to claim 1, further comprising the step of pressurizing the ammonia synthesis gas prior to step (a).

3. The process according to claim 2, further comprising the step of purifying the pressurized ammonia synthesis gas by removing water and carbon dioxide.

4. The process according to claim 3, further comprising the step of pressurizing the purified ammonia synthesis gas.

5. A method of increasing production capacity of an existing ammonia synthesis process from a hydrogen and nitrogen-containing synthesis gas, the existing synthesis process comprising an existing synthesis loop having:

means to supply fresh synthesis gas;

a single recirculation compressor;

means to cycle a first make-up gas stream from the recirculation compressor to an ammonia reactor;

means to withdraw a first process stream being rich in ammonia from the reactor;

means to separate the first process stream into an ammonia product stream and a first recycle stream;

means to cycle the first recycle stream to the recirculation compressor; and means for admixing the first recycle stream with fresh synthesis gas;

the method comprising adding a second parallel synthesis loop to the existing synthesis loop, the second synthesis loop being connected in parallel with the existing synthesis loop, the second synthesis loop comprising:

a second ammonia reactor connected in parallel with the existing synthesis loop;

means to introduce a second recycle gas stream to the recirculation compressor for compression;

means to cycle a second make-up gas stream from the recirculation compressor to the second ammonia reactor;

means to withdraw a second process stream being rich in ammonia from the second reactor;

second means to separate the second process stream into a second ammonia product stream and second recycle stream; and means to cycle the second recycle stream, the second parallel synthesis loop being added to the existing synthesis loop by:

connecting the means to cycle the second recycle stream to the means to cycle the first recycle stream in the existing loop whereby the recycle streams are combined upstream of the existing means for admixing the first recycle stream with fresh synthesis gas; and connecting the means to cycle the second make-up gas stream to the means to cycle the first make-up gas stream in the existing loop.

\* \* \* \* \*